United States Patent [19]

Beane

[11] 4,118,940
[45] Oct. 10, 1978

[54] DRAIN LINE AND METHOD OF INSTALLING

[76] Inventor: Frank T. Beane, Rte. 7, Hwy. 49, Concord, N.C. 28025

[21] Appl. No.: 826,974

[22] Filed: Aug. 23, 1977

[51] Int. Cl.² .............................................. F16L 1/04
[52] U.S. Cl. ................................... 405/174; 210/484; 61/45
[58] Field of Search .................. 61/72.5, 72.6, 72.7, 61/10–13; 214/1 P; 285/260; 210/484, 489

[56] References Cited

U.S. PATENT DOCUMENTS

| | | |
|---|---|---|
| 3,421,609 | 1/1969 | Schmunk .......................... 61/72.5 X |
| 3,422,631 | 1/1969 | Silverman ......................... 61/72.7 X |
| 3,565,269 | 2/1971 | Martin .............................. 61/72.5 X |
| 3,639,130 | 2/1972 | Eichin et al. ..................... 210/484 X |
| 3,976,578 | 8/1976 | Beane ....................................... 61/11 |
| 4,003,122 | 1/1977 | Overmyer et al. ............... 61/72.6 X |

Primary Examiner—Dennis L. Taylor
Attorney, Agent, or Firm—Bell, Seltzer, Park & Gibson

[57] ABSTRACT

A drain line and a method of installing a drain line in a field in which a plurality of drain tiles each of determinant length are drawn into and maintained in alignment within a trench by means of an elastic, permeable, tubular knit fabric sleeve having a length substantially greater than the length of any one of the drain tiles.

5 Claims, 4 Drawing Figures

DRAIN LINE AND METHOD OF INSTALLING

The use of drain lines in land improvement is long established and widely known. Historically, drain lines have been formed by aligning a plurality of drain tiles, each of a determinant, relatively short length, in a trench or the like. More recently, reliance has come to be placed upon flexible corrugated drain pipe manufactured by blow molding plastics, due to the comparative ease with which such drain lines are installed and the avoidance of interruption in draining by misalignment of such pipe. As will be understood, substantially continuous manufacturing processes for corrugated drain pipe result in such pipe being manufactured and installed in relatively great lengths, on the order of 100 to 500 or more feet in each length. At least in part due to the avoidance of any misalignment problem, corrugated drain pipe has largely supplanted more traditional and conventional "hard" drain tile in certain applications. As herein used, the term "hard drain tile" refers to drain tile manufactured or fired clay, concrete or comparable essentially inflexible materials, and handled in determinant, relatively short lengths such as 2 to 10 feet.

It is an object of the present invention to assure that a plurality of drain tiles positioned in a trench are properly drawn into and maintained in alignment so as to define an operative drain line even against soil shifting forces. In realizing this object of the present invention, drain tiles being placed in a trench are enclosed with an elastic, permeable, tubular knit fabric sleeve.

Yet a further object of the present invention is to improve methods of installing drain lines formed by a plurality of aligned hard tiles. In realizing this object of the present invention, such hard tiles are drawn into and maintained in alignment due to the enclosure thereof with an elastic tubular knit fabric sleeve having a length substantially greater than the length of any one of the drain tiles.

Yet a further object of the present invention is to assure desired draining action for a drain line formed by a plurality of aligned, hard drain tiles. This object of the present invention is realized by blocking soil particles above certain sizes from entering into the drain line by use of a tubular knit fabric sleeve having certain characteristics.

Other objects of the invention appear as the description proceeds, when taken in connection with the accompanying drawings, in which —

While this invention will be described hereinafter with particular reference to the accompanying drawings, it is to be understood at the outset of the description which follows that it is contemplated that the present invention may be modified in various ways while still attaining the benefits and advantages contemplated. For this reason, the description which follows is to be understood as a broad teaching directed to persons skilled in the applicable arts, and not as limiting upon the present invention.

Figure 1:
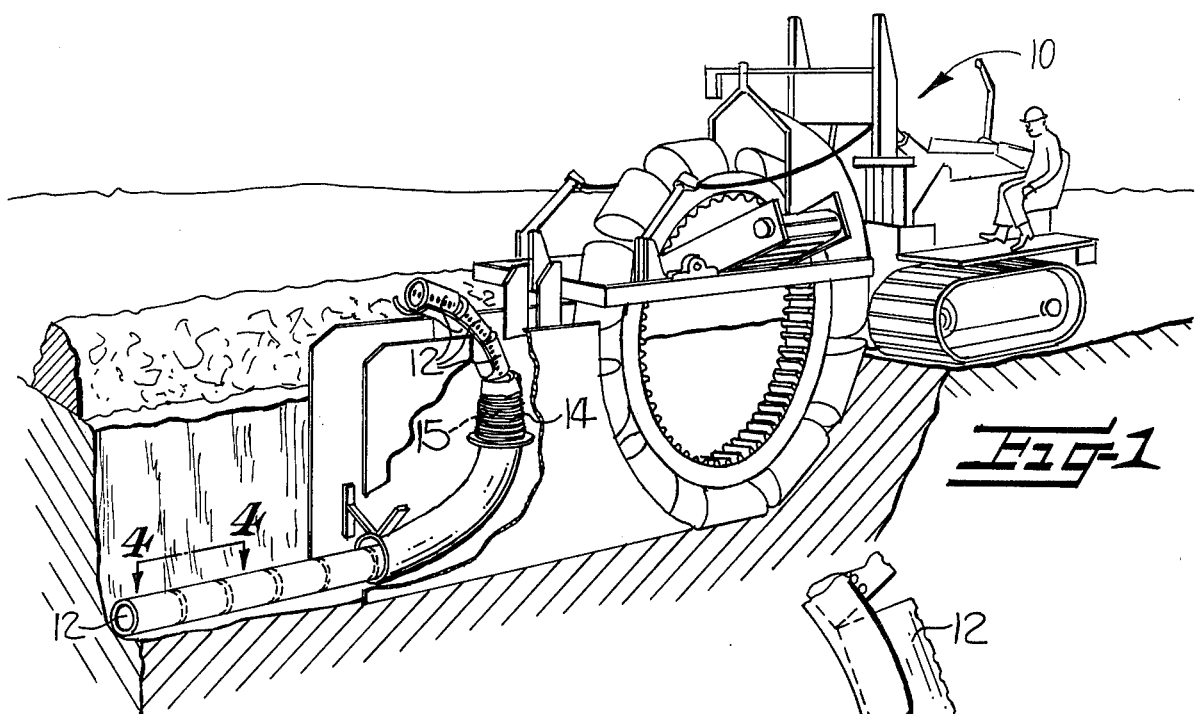
FIG. 1 is a perspective view, partially schematic and partially in section, illustrating the method of the present invention and a drain line resulting from the practice of that method.

In accordance with the method of the present invention, drain lines to be installed in a field, such as agricultural drain lines installed in a crop field or land improvement drain lines installed in connection with highway construction, are put into place in accordance with substantially conventional steps which include excavating a trench and placing in the trench a plurality of drain tiles each of determinant length. Heretofore, such drain line installations have been accomplished by manual trenching and through the use of ditching machines having a digging apparatus and a tile placing chute. A ditching machine is indicated generally in FIG. 1 at 10 and, while shown to be of one specific type, is contemplated as being of any suitable or satisfactory type or size. Thus, the digging apparatus of a ditching machine 10 may be a circular arrangement of buckets (as shown) or some other known arrangement. Similarly, a tile placing chute for the machine may take the generally upright and arcuate form shown or may take other forms known to persons skilled in the applicable arts.

Heretofore, the placement of hard drain tiles such as the tiles 12 into a trench to form a drain line has entailed an operator or the like entering into the trench or ditch into which the tiles are to be placed, in order to assure that the tiles are brought into alignment and are not disturbed when earth or other fill material is placed above and around the tiles in the step known as backfilling. Notwithstanding such use of an operator in the trench, soil pressures occurring either during backfilling or subsequently with shifting of soil force adjacent tiles into misalignment, permitting soil to enter into the drain line defined by the drain tiles, eventually clogging and blocking the drain line.

In order to assure that drain tiles such as the tiles 12 are drawn into and maintained in alignment, the present invention contemplates that the drain tiles being placed into a trench will be enclosed with an elastic, permeable, tubular knit fabric sleeve 14 having a length substantially greater than the length of any one of the drain tiles. In the particular form illustrated, the drain tiles 12 are hard tiles such as may be produced of fired clay or concrete, have plain ends, are perforated to facilitate entry of water thereinto, and may have a typical five inch outside diameter with a four inch inside diameter and a length of 12 to 18 inches. For such a tile, the fabric sleeve 14 may be knitted of 80 denier polyester or polyethylene yarn, false twist textured to have a suitable crimp and knit in a one by one lock stitch construction tube. The tube has such an elasticity as to have a circumference, when stretched, of approximately 6 inches more than the outside circumference of the drain tile, with the yarn and fabric construction imparting such elasticity that the relaxed circumference of the sleeve 14 is less than the tile circumference. Suitable fabrics may be constructed using alternate stitch locked tucking in alternate courses and approximately 400 stitches per course.

It is desirable that the construction of the sleeve 14 be such as to assure that soil particles sized 100 microns and more are blocked from passing therethrough, while particles sized 25 microns and less (which are readily waterborne) are permitted to pass for reasons to be pointed out more fully hereinafter. Such a sleeve will block growth of roots into the drain line. Such sleeves may be constructed of nylon yarns and/or yarns which are not crimped. On larger sizes of hard drain tile, such as 8 and 10 inch inside diameter, circumferential differences between the circumference of the stretched sleeve and the outside circumference of the drain tile may range up to 10 inches or more, depending upon the elasticity of the specific fabric construction and yarn chosen.

Figure 3:
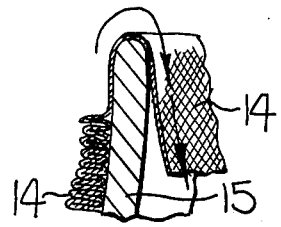
FIG. 3 is a further enlarged detail elevation view, partially in section, taken generally as indicated by the numeral 3 in FIG. 2.

Due to the elasticity of the sleeve, the sleeve 14 may be shirred onto a tubular support 15 (FIGS. 2 and 3) having an inside diameter greater than the outside diameter of the drain tiles 12. Such a tubular support 15 or canister may be constructed to be a readily interchangeable portion of a tile placing chute of the ditching machine 10, so that drain tiles may be passed through the support 15 and into the sleeve 14. While the sleeve 14 is shown to be shirred over the support 15 in such a way as to be led over the upper edge thereof and downwardly through the support, persons skilled in the appropriate art will understand that the tubular support can be so constructed as to provide for withdrawal of the shirred sleeve 14 from the leading end of the shirred portion thereof, rather than from the trailing end as shown in FIGS. 2 and 3.

Figure 2:
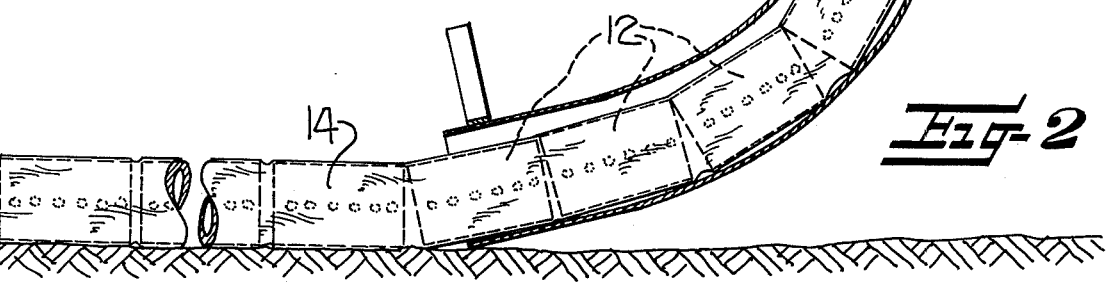
FIG. 2 is an enlarged elevation view, partially in section, showing a portion of apparatus illustrated in FIG. 1.
Figure 4:
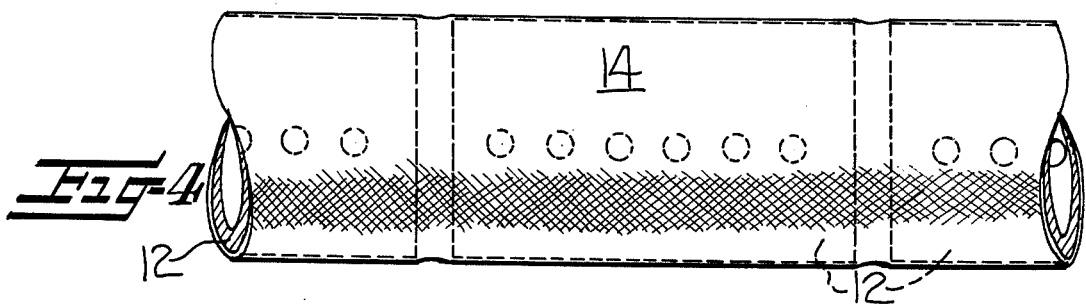
FIG. 4 is an enlarged elevation view showing a drain line in accordance with the present invention.

As will be appreciated from FIGS. 2 and 4, adjacent enclosed drain tiles 12 having the plain ends thereof spaced one from another. Thus, liquid flow into the drain line defined by the spaced tiles is accommodated through the sleeve and the interstices between the spaced tiles. The sleeve 14 thus serves the further function of blocking the entry of soil particles into the drain line, thereby preventing clogging of the line such as might otherwise occur.

In the drawings and specification, there has been set forth a preferred embodiment of the invention, and although specific terms are employed, they are used in a generic and descriptive sense only and not for purposes of limitation.

That which is claimed is:

1. In a method of installing drain lines in a field by excavating a trench, placing in the trench a plurality of drain tiles each of determinate length, and backfilling the trench, an improvement which more positively aligns the drain tiles and maintains such alignment against shifting soil and comprising the steps of enclosing the drain tiles being placed in the trench with an elastic, permeable, tubular knit fabric sleeve having a length substantially greater than the combined length of a plurality of the drain tiles, and forcibly aligning adjacent drain tiles in the trench and thereafter maintaining such drain tiles in alignment by means of the elasticity of the enclosing sleeve.

2. A method according to claim 1 wherein the steps of excavating a trench and placing drain tiles therein comprise traversing the field with a ditching machine having a digging apparatus and a tile placing chute and further wherein the step of enclosing the drain tiles comprises inserting the drain tiles into the sleeve while directing the drain tiles along the chute.

3. A method according to claim 1 wherein the step of enclosing the drain tiles comprises shirring the sleeve onto a tubular support having an inside diameter greater than the outside diameter of the drain tiles and passing the drain tiles through the support and into the sleeve.

4. A method according to claim 1 further comprising the steps of spacing adjacent enclosed drain tiles one from another, accommodating liquid flow into the drain line defined by the spaced tiles through the sleeve and the interstices between the spaced tiles, and blocking with the sleeve the entry of soil particles into the drain line.

5. In a method of installing in a field drain lines defined by a plurality of hard drain tiles each of determinate length by traversing the field with a ditching machine having a digging apparatus and a tile placing chute, excavating a trench, and directing the tiles down the chute into position in the trench, an improvement which more positively aligns the drain tiles and maintains such alignment against shifting soil and comprising the steps of shirring an elastic, permeable, tubular knit fabric sleeve having a length substantially greater than the combined length of a plurality of the drain tiles onto a tubular support having an inside diameter greater than the outside diameter of the drain tiles; positioning the support for passage of drain tiles therethrough upon the drain tiles being directed into the trench; enclosing the drain tiles being directed into the trench in the sleeve while passing the drain tiles through the support; and forcibly aligning adjacent drain tiles in the trench and thereafter maintaining such drain tiles in alignment by means of the elasticity of the enclosing sleeve.

* * * * *